United States Patent
Congdon et al.

(10) Patent No.: US 8,189,573 B2
(45) Date of Patent: May 29, 2012

(54) METHOD AND APPARATUS FOR CONFIGURING AT LEAST ONE PORT IN A SWITCH TO BE AN UPSTREAM PORT OR A DOWNSTREAM PORT

(75) Inventors: Brad Congdon, Olympia, WA (US); Arthur T. Chan, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 904 days.

(21) Appl. No.: 11/316,802

(22) Filed: Dec. 22, 2005

(65) Prior Publication Data

US 2007/0147359 A1    Jun. 28, 2007

(51) Int. Cl.
*H04Q 11/00* (2006.01)
*H04L 12/50* (2006.01)
(52) U.S. Cl. ........................................ 370/360; 370/386
(58) Field of Classification Search ........................ None
See application file for complete search history.

(56) References Cited

U.S. PATENT DOCUMENTS

| | | | |
|---|---|---|---|
| 6,009,488 A | 12/1999 | Kavipurapu | |
| 7,293,129 B2* | 11/2007 | Johnsen et al. | 710/313 |
| 7,356,636 B2* | 4/2008 | Torudbakken et al. | 710/313 |
| 7,424,565 B2* | 9/2008 | Sandven et al. | 710/310 |
| 2004/0111535 A1* | 6/2004 | Boucher et al. | 709/250 |
| 2004/0172494 A1* | 9/2004 | Pettey et al. | 710/305 |
| 2005/0125590 A1* | 6/2005 | Li et al. | 710/317 |
| 2005/0147117 A1* | 7/2005 | Pettey et al. | 370/463 |
| 2005/0246460 A1* | 11/2005 | Stufflebeam, Jr. | 710/104 |
| 2005/0249297 A1* | 11/2005 | Kratochwil | 375/260 |
| 2005/0270988 A1* | 12/2005 | DeHaemer | 370/254 |
| 2006/0159115 A1* | 7/2006 | Haneda et al. | 370/422 |
| 2006/0206655 A1* | 9/2006 | Chappell et al. | 710/315 |
| 2007/0097870 A1* | 5/2007 | Aboukarr et al. | 370/241.1 |
| 2007/0112992 A1* | 5/2007 | Schanke et al. | 710/307 |

* cited by examiner

*Primary Examiner* — John Blanton
(74) *Attorney, Agent, or Firm* — Caven & Aghevli LLC (57) ABSTRACT

A method and apparatus are described herein for configuring at least one port in a switch to be an upstream port or a downstream port based, at least in part, on a control signal. If a component includes both a switch and an endpoint, the method and apparatus support configuration of the endpoint to either couple to an upstream port or to a downstream port. In one embodiment, this method and apparatus are used with PCI Express interconnects.

20 Claims, 10 Drawing Sheets

Figure 1
Computer System 100
PRIOR ART

Figure 2
Switch 200

Figure 10
Computer System 1000

METHOD AND APPARATUS FOR CONFIGURING AT LEAST ONE PORT IN A SWITCH TO BE AN UPSTREAM PORT OR A DOWNSTREAM PORT

FIELD

Embodiments of the invention generally relate to the field of switch components and, more particularly, to systems, methods and apparatuses for configuring at least one port in a switch to be an upstream port or a downstream port.

BACKGROUND

PCI Express (PCIE) switch components are a new technology. For more information, see PCI Express Base Specification, Revision 1.1. The PCIE Specification describes a switch architecture, but there are few examples of PCIE switches in the marketplace. The PCIE Specification describes a "fixed" architecture for PCIE switches, with a fixed number of links at pre-determined widths.

Figure 1:
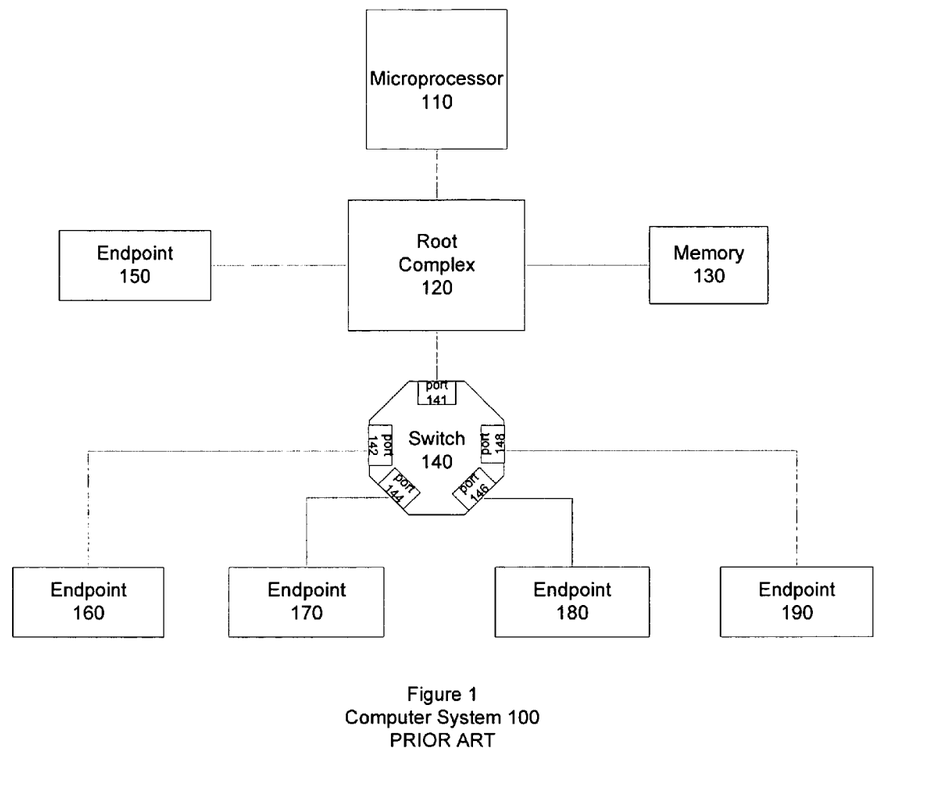
FIG. 1 is a prior art embodiment of a typical hierarchical organization of a computer system.

FIG. 1 illustrates one embodiment of a PCIE topology. Computer system 100 includes a root complex (RC) 120, multiple endpoints 160, 170, 180, and 190, and switch 140. Root complex 120 denotes the root of an input/output (I/O) hierarchy that connects the microprocessor 110 and memory 130 subsystem to the I/O. As illustrated, root complex 120 supports one or more PCIE ports where each interface defines a separate hierarchy domain. Each hierarchy domain may be composed of a single endpoint 150 or a sub-hierarchy containing switch 140 and endpoints 160, 170, 180, and 190. Endpoint refers to a type of I/O device that can request or complete a transaction.

As used herein, the term upstream refers to a direction up the hierarchy of connection, e.g. towards root complex 120. The port on a switch that is closest topologically to the root complex is the upstream port. As an example, in FIG. 1, port 141 on switch 140 is an upstream port. Inversely, downstream, as used herein refers to a direction down the hierarchy of connection, e.g. away from root complex 120. The ports on a switch that are not the upstream port are downstream ports. In FIG. 1, ports 142, 144, 146, and 148 are downstream ports.

PCIE switch 140 provides the capability of a multi-drop bus in a PCIE hierarchy. On the upstream side of PCIE switch 140 is a single PCIE link. On the downstream side of PCIE switch 140 are one or more PCIE links.

Prior art switches have a pre-defined maximum width for the upstream PCIE connection and a fixed number of downstream PCIE connections. This limitation necessarily requires trade-offs not acceptable to all customers, or requires multiple separate components to satisfy the market requirements of all customers. For example, one customer might desire high fan-out connectivity and would value multiple downstream PCIE buses to satisfy a certain market requirement, while another customer might desire enhanced power management, and would not value multiple downstream PCIE buses, to satisfy a different market requirement. In order to satisfy multiple market requirements for switches, separate components are currently required.

If a component contains both a switch and an endpoint, the endpoint is placed ("hardwired") in one of two places. For increased performance, an endpoint is attached directly to a PCIE root complex, using one of the connections available directly onto the root complex. For increased connectivity, an endpoint is attached further away from the root complex, downstream of a PCIE switch, thus keeping the high-bandwidth root complex connection available. A customer may require either one of these configurations, so separate components are currently required.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus are described herein for configuring at least one port in a switch to be an upstream port or a downstream port based, at least in part, on a control signal. If a component includes both a switch and an endpoint, the method and apparatus support configuration of the endpoint to either couple to an upstream port or to a downstream port. In one embodiment, PCI Express (PCIE) interconnects are used to transfer information between components. The following description illustrates the techniques described herein using PCIE. However, it will be apparent to one skilled in the art that the techniques described herein can apply to other interconnect systems.

Figure 2:
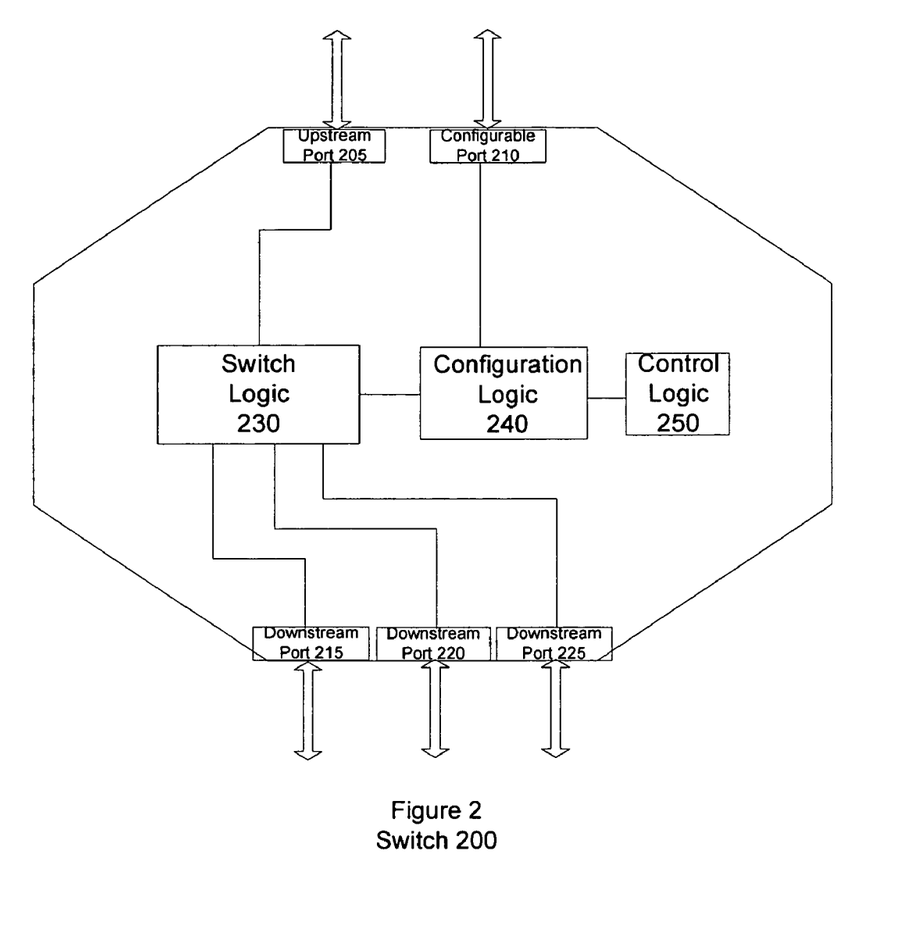
FIG. 2 is a block diagram of a switch having configuration logic and control logic according to an embodiment of the invention.

Unlike prior art switches that have a pre-defined maximum link width for the upstream port and a fixed number of downstream ports, FIG. 2 depicts a component where at least one of the ports is configurable to be an upstream port or a downstream port. Referring to FIG. 2, switch 200 has one upstream port 205 and three downstream ports 215, 220, and 225, all coupled to switch logic 230. Control logic 250, coupled to configuration logic 240, controls the configuration. In one embodiment, control logic 250 controls the configuration using a control signal. Configuration logic 240 is coupled to switch logic 230 and configurable port 210. Switch logic 230 directs data between the ports. Configuring configurable port 210 to be a downstream port creates an additional downstream port or expands the link width of an existing downstream port. Configuring configurable port 210 to be an upstream port expands the link width of the existing upstream port. In an alternative embodiment, configuring configurable port 210 to be an upstream port creates an additional upstream port.

This configurability allows one switch component to increase bandwidth, increase connectivity, or a combination of the two. Embodiments of the techniques described herein allow a single small and inexpensive switch component to meet either bandwidth or connectivity requirements by providing a configuration ability so that the switch can use one or more PCIE links as either upstream links (for bandwidth) or as downstream links (for connectivity).

Figure 3:
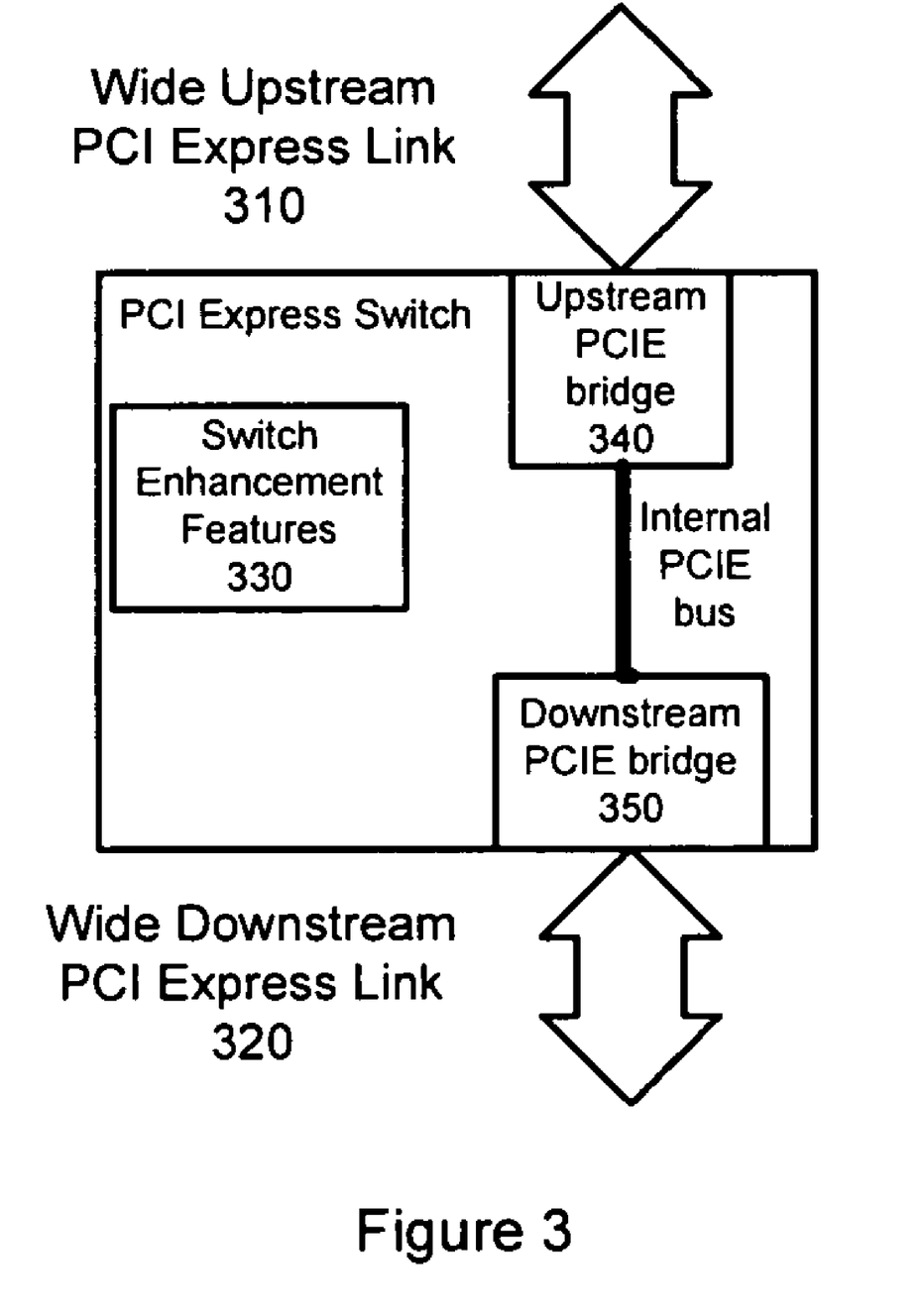
FIG. 3 illustrates another embodiment of a switch.

FIG. 3 illustrates one embodiment of a switch configured for increased bandwidth. Switch enhancement features 330 include configuration logic and control logic. Upstream PCIE bridge 340 is coupled to an internal PCIE bus which is coupled to downstream PCIE bridge 350. As used herein, a bridge is a device that virtually or actually connects a PCIE port with an internal component interconnect or with another PCIE port. Wide upstream PCIE link 310, coupled to upstream PCIE bridge 340, is matched by wide downstream PCIE link 320, coupled to downstream PCIE bridge 350. By configuring the switch in this manner, the switch maintains high bandwidth through the switch between the upstream side and downstream side, with no other downstream links competing for bandwidth.

Figure 4:
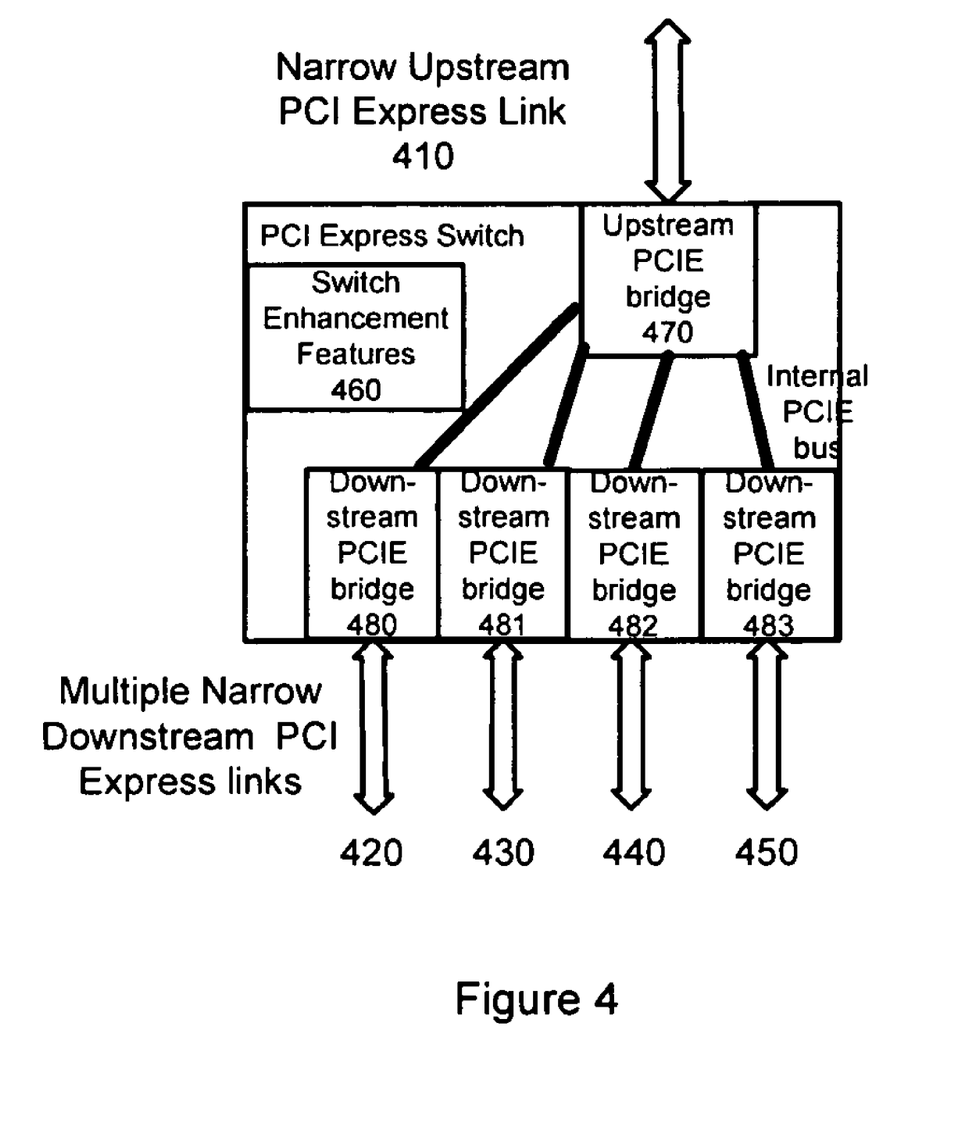
FIG. 4 illustrates yet another embodiment of a switch.

FIG. 4 illustrates an embodiment of a switch configured for increased connectivity. Switch enhancement features 460 include configuration logic and control logic. Downstream PCIE links 420, 430, 440, and 450 are coupled to downstream PCIE bridges 480, 481, 482, and 483, respectively. Upstream PCIE link 410 is coupled to upstream PCIE bridge 470. Downstream PCIE bridges 480-483 are coupled to upstream PCIE bridge 470 through an internal PCIE bus. Downstream PCIE links 420, 430, 440, and 450 provide multiple entry points for I/O into the PCIE hierarchy through upstream PCIE link 410.

Figure 5:
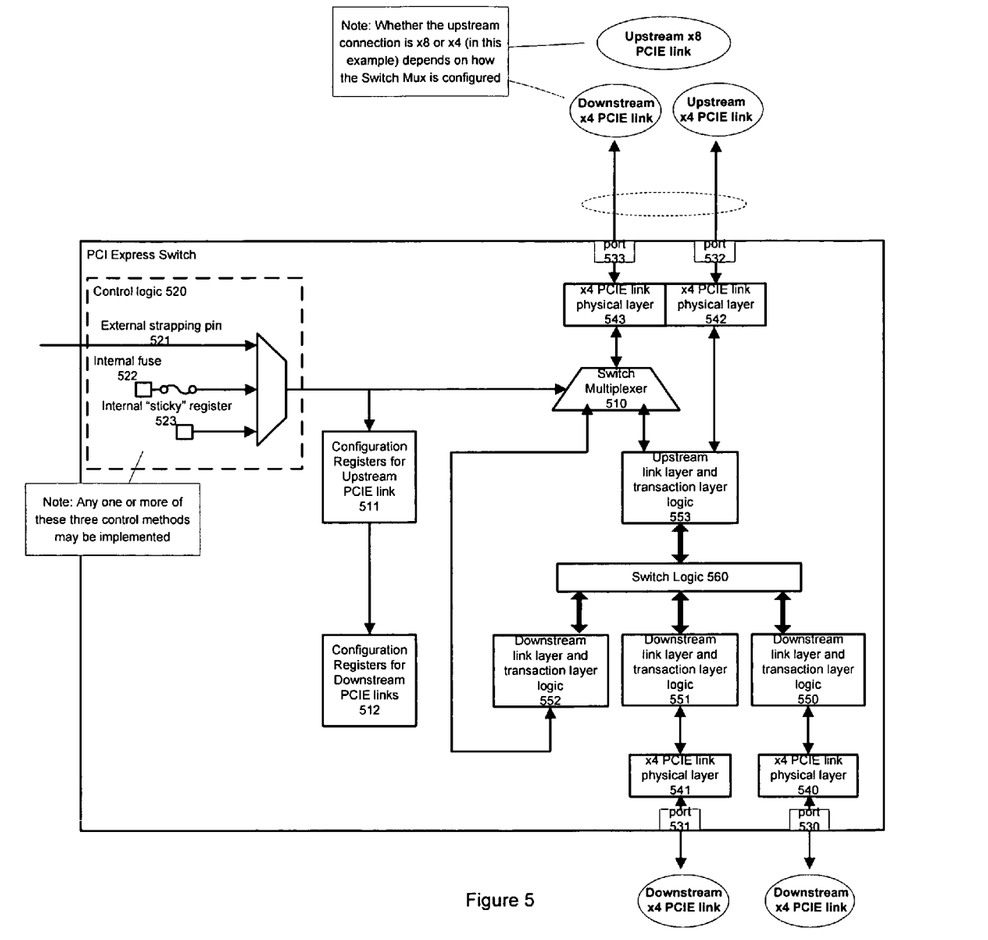
FIG. 5 is a detailed block diagram of a switch.

FIG. 5 is a detailed block diagram of one embodiment of a switch, using ×4 PCIE links as an example. PCIE uses three discrete logical layers: the physical layer, the link layer, and the transaction layer. Physical layers 540, 541, 542, and 543 directly interact with the communication medium between components. Link layer and transaction layer logic 550, 551, 552, and 553 represent both the transaction layer, which operates at the level of transactions (for example, read and write), and the link layer, which is the intermediate layer between the transaction layer and the physical layer. Configuration registers 511 and 512 store information used to configure the upstream and downstream links. Switch logic 560 directs data between the plurality of ports 530, 531, 532, and 533.

A typical PCIE transaction flow from a downstream port to an upstream port is as follows: the transaction moves from downstream port 530 to ×4 PCIE link physical layer 540 to downstream link layer and transaction layer logic 550 to switch logic 560 to upstream link layer and transaction layer logic 553 to ×4 PCIE link physical layer 542 to upstream port 532. Configuration logic and control logic 520 support configurable port 533. In one embodiment, configuration logic includes switch multiplexer 510, configuration registers for the upstream PCIE link 511, configuration registers for the downstream PCIE links 512, upstream link layer and transaction layer logic 553, downstream link layer and transaction layer logic 552, and physical layer 543.

Control logic 520 may be implemented in many ways. In one embodiment, control logic 520 is an external strapping pin 521. In another embodiment, control logic 520 is an internal fuse 522. In yet another embodiment, control logic 520 is an internal "sticky" register 523. In one embodiment, control logic 520 can be reconfigured on each powering of the system; in an alternative embodiment, control logic 520 is "hardwired" based on platform specifications. Control logic 520, coupled to the configuration logic, sends a control signal to switch multiplexer 510 to select either upstream link layer and transaction layer logic 553 or downstream link layer and transaction layer logic 552. In one embodiment, if switch multiplexer 510 is configured to select upstream link layer and transaction layer logic 553, configurable port 533 becomes an upstream port and increases the upstream link width to ×8. If switch multiplexer 510 is configured to select downstream link layer and transaction layer logic 552, configurable port 533 becomes a downstream port and creates another downstream ×4 PCIE port.

Although FIG. 5 shows one embodiment of an implementation employing the techniques described herein, these techniques are not restricted to this example. Note that FIG. 5 uses ×4 PCIE links as an example; however, any arbitrary size of standard PCIE bus (×1, ×2, ×4, ×8, ×12, or ×16) may be used. In addition, this example illustrates the configuration of the configurable port to increase the upstream link width to ×8 or to create an additional ×4 downstream link; however, in alternative embodiments, configuration of the configurable port can also expand the link width of an existing downstream link or create an additional upstream link. Also note that FIG. 5 shows an embodiment of a single configurable port. However, the techniques described herein comprehend multiple configurable ports. For example, two ×4 ports may be routed such that both are configured as downstream ports, or one is configured as a downstream port while the other is configured to expand the upstream port width, or both are configured to expand the upstream port by their combined width. In this example, switch multiplexer 510 is placed between the physical layer and the link and transaction layers. In an alternative embodiment, switch multiplexer 510 is placed before the last stage of the physical layer where the final parallel-to-serial (transmit side) conversion or serial-to-parallel (receive side) conversion takes place.

Figure 10:
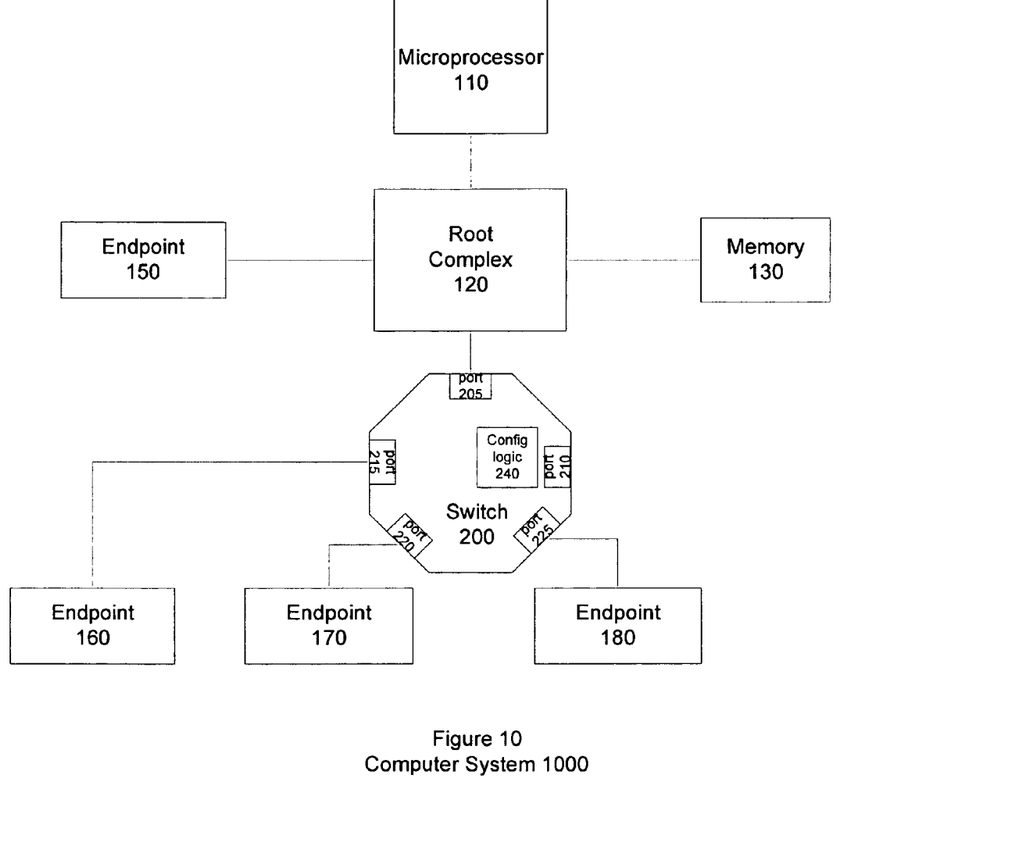
FIG. 10 illustrates an embodiment of a computer system.

FIG. 10 depicts one embodiment of a computer system containing the switch of FIG. 2. Computer system 1000 includes root complex 120, multiple endpoints 150, 160, 170, and 180, and switch 200. Root complex 120, coupled to microprocessor 110 and memory 130, supports one or more ports. Switch 200 is coupled to root complex 120 through upstream port 205 and coupled to endpoints 160, 170, and 180 through downstream ports 215, 220, and 225, respectively. Configuration logic 240, coupled to configurable port 210, selects whether configurable port 210 is an upstream port or a downstream port.

If a component contains both a switch and an endpoint, the configurability of the component allows the endpoint to couple to an upstream port or to a downstream port. A PCIE endpoint is an I/O function (such as, for example, a disk controller or a wireless LAN) that resides at the downstream end of a PCIE hierarchy. For increased performance, an endpoint is attached directly to a PCIE root complex, using one connection available directly onto the root complex. For increased connectivity, an endpoint is attached further away from the root complex, downstream of a PCIE switch, thus keeping the high-bandwidth root complex connection available.

Figure 6:
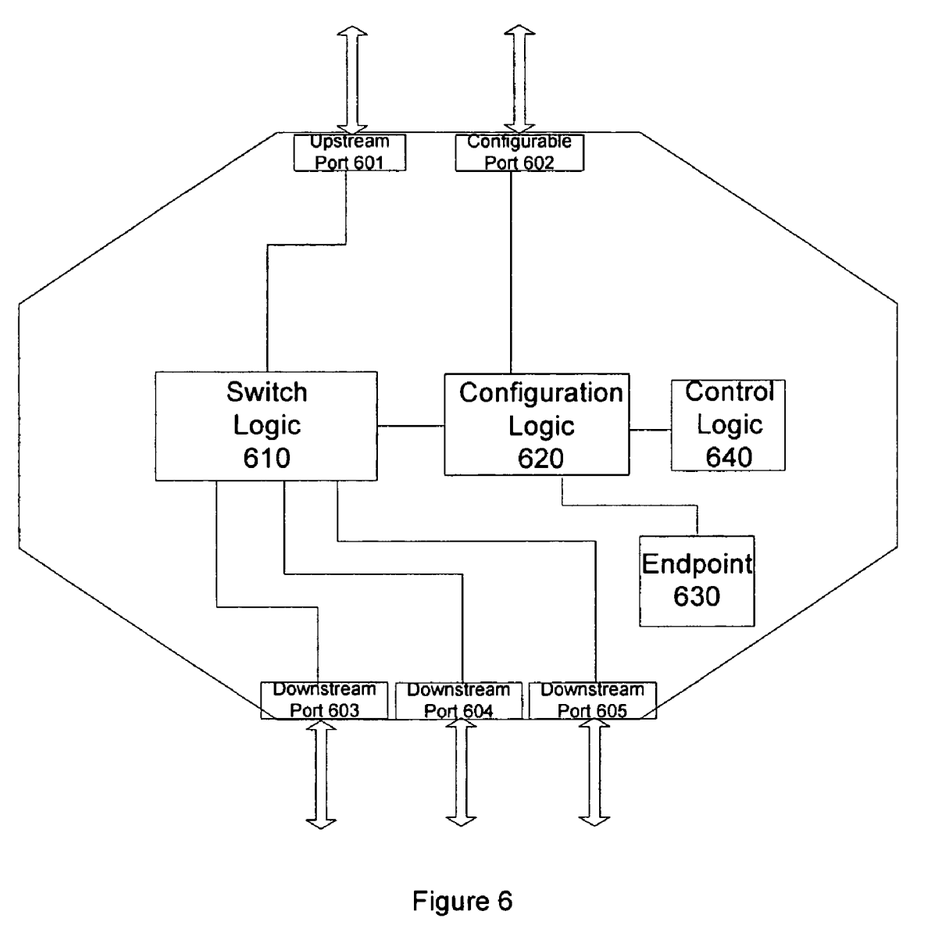
FIG. 6 is a block diagram of a component containing both a switch and an endpoint, having configuration logic and control logic according to an embodiment of the invention.

FIG. 6 depicts a component having at least one configurable port that may be configured as an upstream port or a downstream port and there is also an endpoint within the component. FIG. 6 shows a switch where there is one upstream port 601, three downstream ports 603, 604, and 605, one configurable port 602, and endpoint 630. Upstream port 601 and downstream ports 603, 604, and 605 are coupled to switch logic 610. Control logic 640, coupled to configuration logic 620, controls the configuration. In one embodiment, control logic 640 controls the configuration of configurable port 602 and endpoint 630 using a control signal. Configuration logic 620 is coupled to switch logic 610, configurable port 602, and endpoint 630. Configuring configurable port 602 creates an additional downstream port or creates an additional upstream port, with endpoint 630 coupled accordingly to the newly configured downstream or upstream port.

This configurability allows the endpoint to be positioned for increased bandwidth or increased connectivity, either with the endpoint "parallel to" the switch, such that the switch and endpoint together occupy two PCIE links from the hierarchy, or with the endpoint downstream of the switch, freeing up a link on the root port for increased connectivity. Embodiments of the components described herein allow one component to meet the needs of systems which require either high-bandwidth for the endpoint, or high-connectivity to the PCIE root complex.

Figure 7:
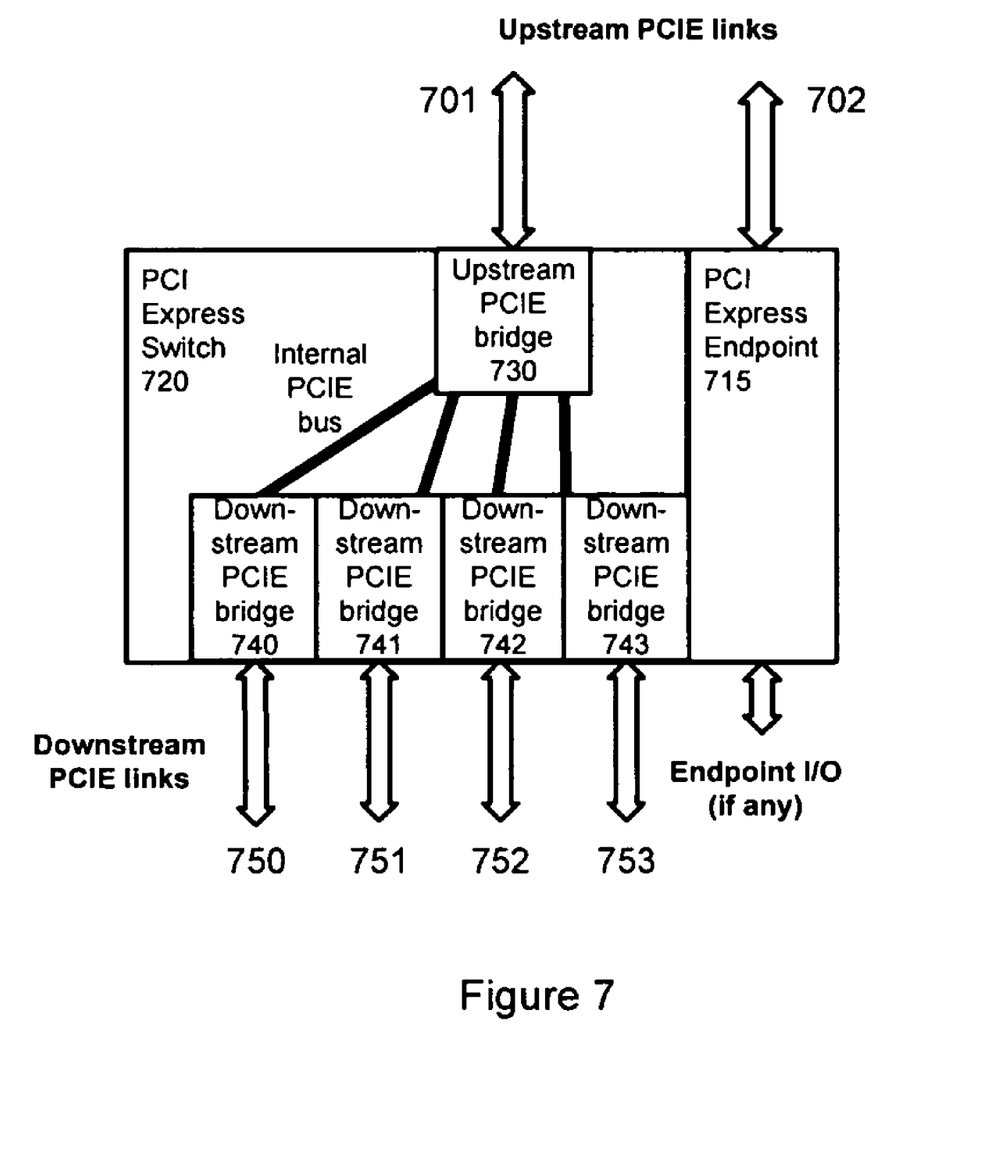
FIG. 7 illustrates another embodiment of a component containing both a switch and an endpoint.

FIG. 7 illustrates one embodiment of a switch/endpoint component where the endpoint placement increases bandwidth for the endpoint. In one embodiment, endpoint 715 is "parallel to" switch 720 and both have equal priority; both switch 720 and endpoint 715 are coupled to the root complex. Upstream bridge 730 from switch 720 is coupled to upstream link 701 and endpoint 715 is coupled to upstream link 702. Upstream bridge 730 is also coupled to an internal PCIE bus which is coupled to downstream bridges 740, 741, 742, and 743. Downstream bridges 740, 741, 742, and 743 are coupled to downstream links 750, 751, 752, and 753, respectively.

Figure 8:
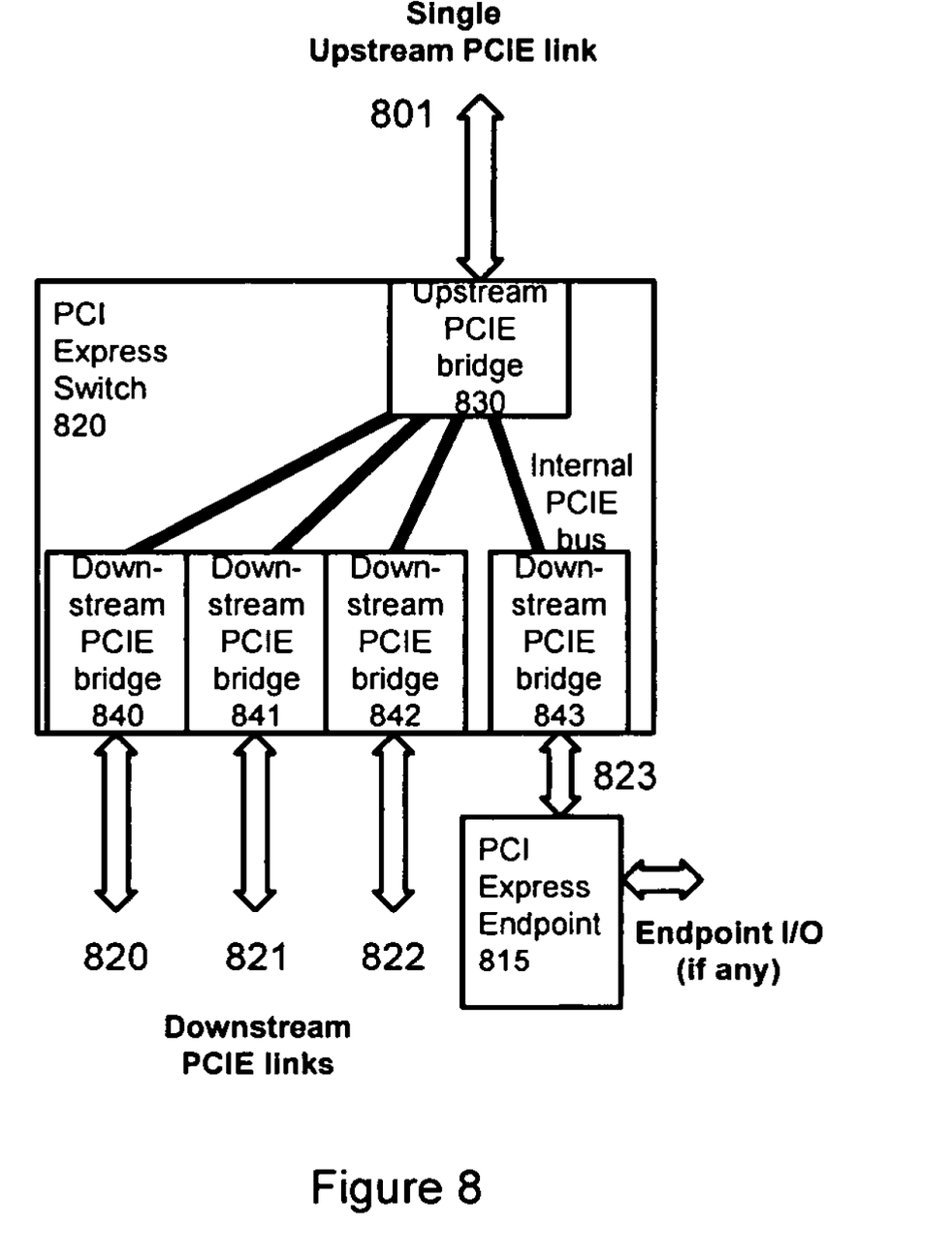
FIG. 8 illustrates yet another embodiment of a component containing both a switch and an endpoint.

FIG. 8 illustrates an embodiment of a switch/endpoint component where the endpoint placement increases connectivity to the root complex by freeing up a link to the root complex for other connections. In this placement, only one connection to the root complex is used for switch 820. Upstream bridge 830 from switch 820 is coupled to upstream link 801 and endpoint 815 is coupled to downstream link 823. Upstream bridge 830 is also coupled to an internal PCIE bus which is coupled to downstream bridges 840, 841, 842, 843. Downstream bridges 840, 841, 842, and 843 are coupled to downstream links 820, 821, 822, and internal link 823, respectively.

Figure 9:
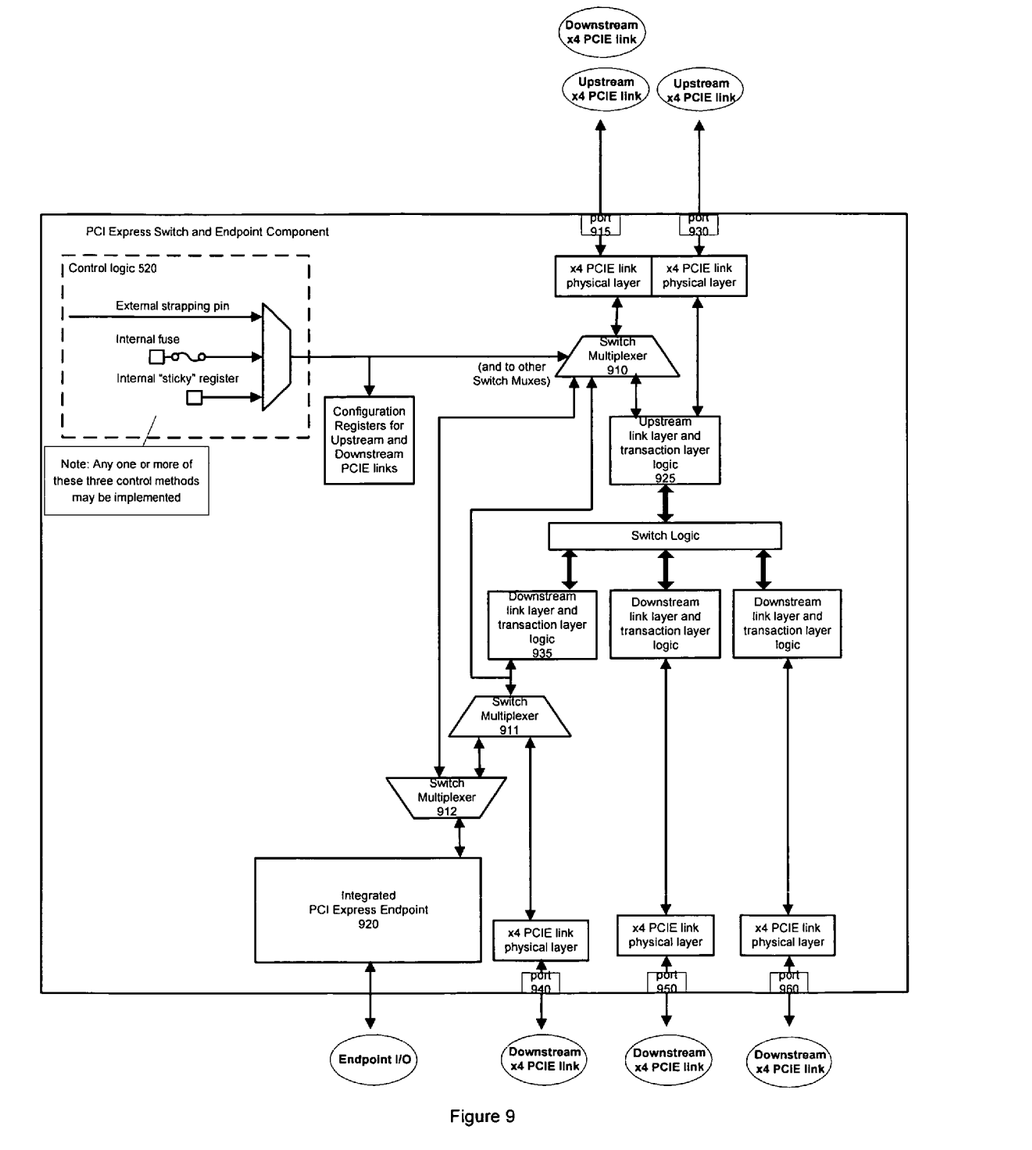
FIG. 9 is a detailed block diagram of a component containing both a switch and an endpoint.

FIG. 9 illustrates an example of a switch and endpoint in one component. The component includes much of the functionality of the switch of FIG. 5. In addition to the blocks described in FIG. 5, this embodiment of a switch/endpoint component includes switch multiplexers 910, 911, and 912 to select the configuration of configurable port 915 and PCIE endpoint 920. If control logic 520 sends a control signal to switch multiplexers 910-912 to bypass upstream link layer and transaction logic 925 and to bypass downstream link layer and transaction layer logic 935, switch multiplexers 910-912 also select PCIE endpoint 920 (which includes its own link and transaction layer logic, similar to upstream link layer and transaction layer 925) to couple to newly configured upstream port 915. In this case, PCIE endpoint 920 is placed "parallel to" the PCIE switch. Both the switch and endpoint are separately coupled to the root complex. The switch is coupled to upstream port 930 and to downstream ports 940, 950, and 960, and PCIE endpoint 920 is coupled to upstream port 915.

If control logic 520 sends a control signal to switch multiplexers 910-912 to select PCIE endpoint 920 to couple to internal downstream link and transaction layer logic 935, switch multiplexers 910-912 can also select upstream link layer and transaction layer logic 925 to couple to port 915. In this case, PCIE endpoint 920 is placed downstream of the switch, replacing downstream port 940, and port 915 is an upstream port. The switch is coupled to upstream port 930 which can now be combined with port 915 to increase the width of the upstream link width, and the switch is coupled to downstream ports 950 and 960 while downstream port 940 is disabled. In an alternative embodiment, upstream port 915 is unused and does not combine with port 930 to increase the upstream link width.

In another alternative embodiment, PCIE endpoint 920 is unused and port 915 can be configured to become an upstream port or a downstream port, similar to port 533 in FIG. 5. If switch multiplexers 910-912 are configured to select upstream link layer and transaction layer 925 to couple to port 915, port 915 becomes an upstream port and increases the upstream link width to ×8. If switch multiplexers 910-912 are configured to select downstream link layer and transaction layer 935 to couple to port 915, port 915 is a downstream port and creates another ×4 PCIE port. In this case, when port 915 is used as a downstream port, port 940 is unconnected.

ADDITIONAL INFORMATION AND EMBODIMENTS

There may be a variety of circuits in the components which are not illustrated in the figures. When the figures show two blocks connected through conductors, there may be intermediate circuitry that is not illustrated. The shape and relative sizes of the blocks is not intended to relate to actual shapes and relative sizes.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B."

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element. If the specification or claims refer to "an additional" element, that does not preclude there being more than one of the additional element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. An integrated circuit comprising:
   a plurality of ports, wherein at least one of the plurality of ports is an upstream port;
   configuration logic, coupled to at least one of the plurality of ports, to select whether the at least one port is an upstream port or a downstream port; and
   switch logic, coupled to at least one of the plurality of ports via one or more multiplexers, to direct data between the plurality of ports, wherein at least one multiplexer of the one or more multiplexers is coupled to the switch logic via an upstream transaction layer logic and a downstream transaction layer logic, wherein an input of the at least one multiplexer is to be selected as an output, to be transmitted to a first link physical layer coupled to a first port of the plurality of ports, based on a signal from a control logic coupled to the configuration logic, wherein the upstream transaction layer logic is coupled to a second link physical layer, different from the first link physical layer, the second link physical layer coupled to a second port of the plurality of ports, and wherein the input is to comprise one of: an output of the upstream transaction layer logic or an output of the downstream transaction layer logic.

2. The integrated circuit of claim 1, wherein the control logic circuitry coupled to the configuration logic is to generate a control indication to select the configuration of the at least one port.

3. The integrated circuit of claim 2, wherein the control indication comprises a signal.

4. The integrated circuit of claim 1, further comprising:
at least one endpoint coupled to the switch logic; and
wherein the configuration logic, coupled to the endpoint, selects whether the endpoint is coupled to an upstream port or to a downstream port.

5. The integrated circuit of claim 1, wherein the configuration logic contains a multiplexer to select upstream port logic or downstream port logic for the at least one port.

6. The integrated circuit of claim 1, wherein the control logic circuitry is an external strapping pin.

7. The integrated circuit of claim 1, wherein the control logic circuitry is an internal fuse.

8. The integrated circuit of claim 1, wherein the control logic circuitry is an internal "sticky" register.

9. A method comprising:
receiving a control input to indicate a configuration of at least one upstream or downstream port in a switch; and
configuring at least one of a plurality of ports to be an upstream port or a downstream port responsive, at least in part, to the control input,
wherein at least one multiplexer is coupled to a switch logic of the switch via an upstream transaction layer logic and a downstream transaction layer logic, and wherein an input of the at least one multiplexer is to be selected as an output, to be transmitted to a first link physical layer coupled to a first port of the plurality of ports, based on a signal from a control logic that is to generate the control input, wherein the upstream transaction layer logic is coupled to a second link physical layer, different from the first link physical layer, the second link physical layer coupled to a second port of the plurality of ports, and wherein the input is to comprise one of: an output of the upstream transaction layer logic or an output of the downstream transaction layer logic.

10. The method of claim 9, further comprising:
receiving the control input to indicate configuration of an endpoint within the switch; and
configuring the endpoint to either couple to an upstream port or to a downstream port responsive, at least in part, to the control input.

11. The method of claim 9, wherein configuring the at least one port to be an upstream port expands the link width of the existing upstream port.

12. The method of claim 9, wherein configuring the at least one port to be an upstream port creates an additional upstream port.

13. The method of claim 9, wherein configuring the at least one port to be a downstream port expands the link width of an existing downstream port.

14. The method of claim 9, wherein configuring the at least one port to be a downstream port creates an additional downstream port.

15. A computer system comprising:
a root complex (RC), coupled to the processor and memory, which supports one or more ports;
a switch, coupled to the RC through at least one upstream port and to a plurality of endpoints through a plurality of downstream ports; and
configuration logic in the switch, coupled to at least one of the plurality of ports, to select whether the port is an upstream port or a downstream port,
wherein at least one multiplexer is coupled to a switch logic of the switch via an upstream transaction layer logic and wherein an input of the at least one multiplexer is to be selected as an output, to be transmitted to a first link physical layer coupled to first port of the plurality of ports, based on a signal from a control logic that is to generate the control input, wherein the upstream transaction layer logic is coupled to a second link physical layer, different from the first link physical layer, the second link physical layer coupled to a second port of the plurality of ports, and wherein the input is to comprise one of: an output of the upstream transaction layer logic or an output of the downstream transaction layer logic.

16. The computer system of claim 15, further comprising:
at least one endpoint coupled to the switch; and
configuration logic, coupled to the endpoint, to select whether the endpoint is coupled to the RC or to an endpoint.

17. The computer system of claim 15, wherein the switch is coupled to the RC by a PCI Express link and coupled to the plurality of endpoints by a plurality of PCI Express links.

18. The computer system of claim 15, wherein the switch is coupled to the RC by a xM PCI Express link and to the plurality of endpoints by a plurality of xN PCI Express links, where M and N can be any arbitrary size of a standard PCI Express link.

19. The computer system of claim 15, wherein the configuration logic contains a multiplexer to select between upstream link layer and transaction layer logic or downstream link layer and transaction layer logic.

20. The computer system of claim 15, wherein the control logic is one of: an external strapping pin, an internal fuse, or an internal "sticky" register.

* * * * *